United States Patent [19]

Davis et al.

[11] 3,760,159

[45] Sept. 18, 1973

[54] ENCODING AND VERIFYING INFORMATION

[75] Inventors: Louis E. Davis, Bountiful; Billy M. Jensen, Sandy; Floyd L. Larson, Granger; Rainer F. Huck; Stephen L. Stumph, both of Salt Lake City, all of Utah

[73] Assignee: Bio-Logics Products, Inc., Salt Lake City, Utah

[22] Filed: Jan. 14, 1972

[21] Appl. No.: 217,774

Related U.S. Application Data

[62] Division of Ser. No. 850,978, Aug. 12, 1969, abandoned.

[52] U.S. Cl. ............................ 235/61.6 R, 340/336

[51] Int. Cl. ......................... G06k 15/00, G08b 5/36

[58] Field of Search ......... 340/324 R, 336, 347 DD, 340/149 A, 165; 317/134, 137, 139; 235/61.11 E, 61.7 B, 61.6 R

[56] References Cited

UNITED STATES PATENTS

| | | | |
|---|---|---|---|
| 2,540,654 | 2/1951 | Cohen et al. | 235/61.11 D |
| 3,601,805 | 8/1971 | Snook | 235/61.11 E |
| 3,434,130 | 3/1969 | Lemelson | 235/61.11 D |
| 3,296,608 | 1/1967 | Feitler et al. | 340/324 R |

OTHER PUBLICATIONS

Bowers, Jr., G. W. and Laenen, E. G., IBM Technical Disclosure Bulletin, Vol. 9, No. 12, May 1967, pp. 1760–1761, Credit Card Reader.

*Primary Examiner*—Daryl W. Cook
*Attorney*—B. Deon Criddle

[57] ABSTRACT

Method and apparatus for encoding a device presenting rows of encodable sites and for verifying the correctness of the encoding of such a device, the apparatus including a ram assembly for press-fitting balls or the like, received from a ball-feeder assembly, into selected ones of the encodable sites, which sites take the form of blind cavities. The encodable device is light-transmitting and, after being encoded, the rows of sites are successively sensed by an optical reader to verify the accuracy of the encoding procedure. Electrical signals, derived from optical signals generated by the reader and representing the code of each row, are converted to Binary Coded Decimal (BCD) data format and stored in a circulating shift register in a row-by-row fashion so that the stored information can be subsequently converted into human readable form.

3 Claims, 17 Drawing Figures

ENCODING AND VERIFYING INFORMATION

This application is a division of our copending application, Ser. No. 850,978, filed Aug. 12, 1969, now abandoned, and assigned to the assignee of the present application.

FIELD OF THE INVENTION

The present invention relates generally to identification systems and particularly to methods and apparatus for encoding and verifying the encoding of a device.

BRIEF SUMMARY AND OBJECTS OF THE INVENTION

An encodable device is encoded by selective impression of information representations. The placement of the information representations is checked for accuracy by a reader, the signals of which are output to a computer, printer or display for visual consideration by the operator. It is a primary object of the present invention to provide novel apparatus and methods for encoding devices.

Another paramount object is the provision of novel apparatus and methods for processing information after it has been read from an encoded device.

Another significant object of the present invention is the provision of novel method and apparatus for verifying the accuracy of code representations placed on encodable devices.

Another principal object of the present invention is the provision of novel apparatus and methods for impressing code information upon devices and for verifying the accuracy of the representations prior to use.

These and other objects and features of the present invention will become more fully apparent from the following description and appended claims taken in conjunction with the accompanying drawings.

DETAILED DESCRIPTION OF THE ILLUSTRATED EMBODIMENT

While the present invention has many applications, it will hereinafter be described in connection with the numeric encoding of an encodable light-transmitting identification device by electromechanically pressing opaque balls into selected ones of spaced and aligned blind recesses in the device. To verify the correct placement of the balls the encoded device is passed through an optical reader which causes the display of the numeric equivalent of the code representations (balls) impressed on the device. Like numerals are used in this specification to designate like parts.

GENERAL

Figure 1:
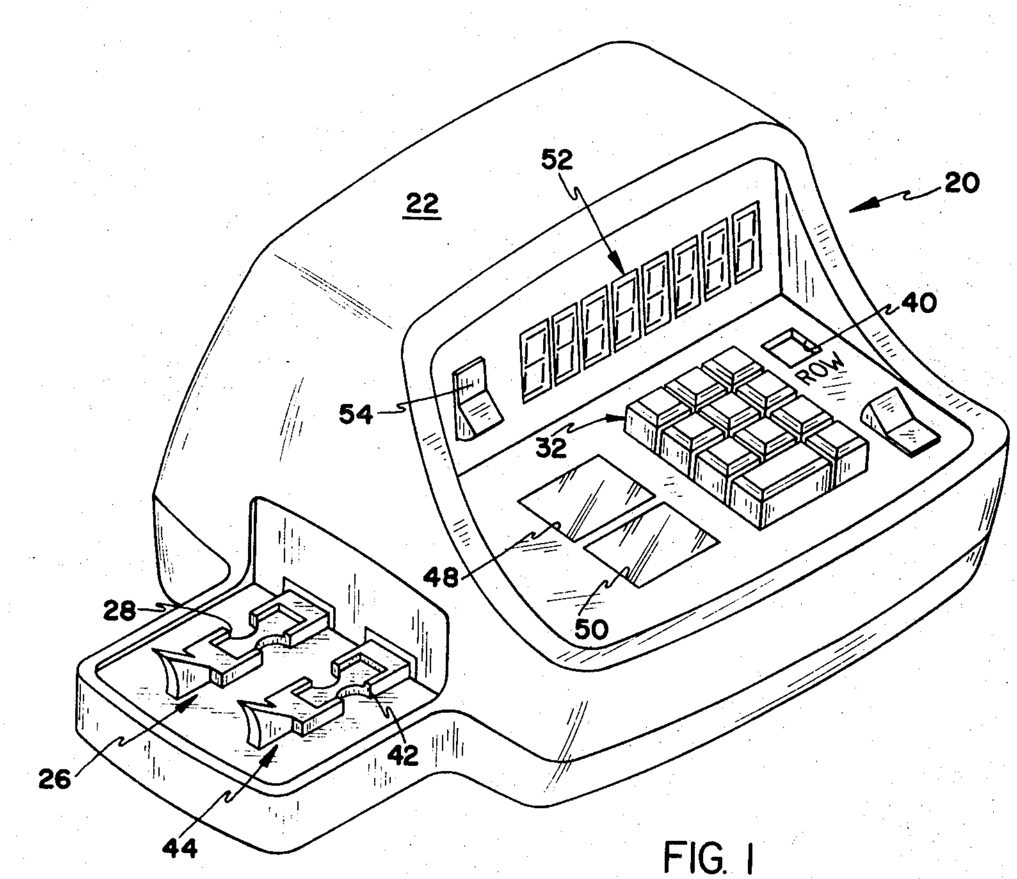
FIG. 1 is a schematic perspective representation viewed largely from the top of an encoding and verifying apparatus according to the present invention.
Figure 2:
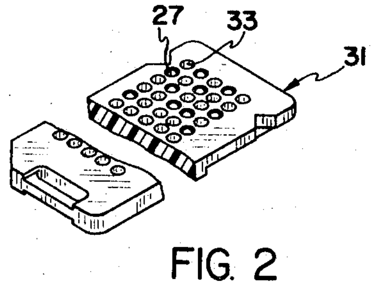
FIG. 2 is a perspective of one suitable identification device.

Reference is made to FIG. 1 which pictorially represents an encoding-reading console, generally designated 20. The apparatus 20 is provided with a contoured housing 22 which contains an encoder, adapted to receive an encodable identification device 31 (FIG. 2) by rectilinear translation of an encoder carrier of an assembly 26 of the encoder. The identification device comprises rows of spaced and aligned blind recesses 33 for selectively receiving shot or balls 27 in press-fit relation at the encoder, the identification device being light-transmitting and the balls being opaque to accommodate subsequent optical reading.

Once the encoder carrier, with the identification device 31 properly inserted in the device-receiving groove 28, has been correctly translated into the encoder, a ram assembly will selectively press the balls into appropriate blind recesses 33 in the device 31 on a row-by-row basis corresponding to the numeral button or key of the keyboard 32 depressed by the operator for each row. The ram assembly receives a continuous supply of balls from a ball-feeder assembly and an indicator drum is rotated in correspondence to the to and fro rectilinear displacement of the encoder carrier by utilization of a takeup drum mechanism to at all times indicate at window 40 the row of blind recesses of the identification device 31 currently ready to be encoded. As each row of blind recesses 33 is encoded, the encoder carrier will be stepped one increment toward its original at-rest position illustrated in FIG. 1.

Once the encoder carrier has been returned to its original, at-rest position with the encoded identification device 31 in the groove 28, the device is removed and placed in the corresponding groove 42 of the reader carriage of an assembly 44 for insertion into the reader of the apparatus 20. The reader optically senses the location of the opaque balls in the selected blind recesses 33 of the identification device 31 as the reader carriage is spring-returned at a constant rate to its original, at-rest position illustrated in FIG. 1. In the event of a parity error, determined by circuit logic, a light will be illuminated at window 48. In the event too many rows are counted, the error will be made evident to the operator by the illumination of light at a window 50.

The logic circuit of the reader causes illumination of numerals on the display panel 52 on a row-by-row basis identical to the numerals represented by the encoding balls in the corresponding rows of the identification device. Where the number of encoded rows exceed the number of lamps in the display 52, a selector switch 54 is used to first illuminate the numeric equivalents of one set of coded rows followed by illumination of a second set.

THE VERIFIER OR READER

In general, the purpose of the reader or verifier portion of the apparatus 20 is to provide an accurate operator check to insure that the identification device 31 was properly encoded with information representations, in the form of balls, by the encoder described in our copending application, Ser. No. 850,978, filed Aug. 12, 1969.

THE READER CARRIER ASSEMBLY

When the identification device 31 is to be verified for correctness, it is placed in the reader carrier 430 of the reader carrier assembly 44. The slot or stepped bore 42 is reserved for this purpose and a contoured abutment surface 432 is provided for the operator, using his thumb, to slide the carrier 430 from the inactive position illustrated in FIG. 1 to an initial reading position within the apparatus 20. Thereafter, the code verification occurs automatically and the numeric equivalents of the code on a row-by-row basis are illuminated at the display panel 52 (FIG. 1). In addition to the top plate 431, the carrier 430 integrally comprises vertically erect columns 434 which also serve as spacers and a bottom, horizontally-disposed slide plate 436, which is reciprocably received in side notches 438 of spaced tracks 440. The tracks 440 are preferably formed of nylon or similar plastic material to accommodate smooth displacement of the slide plate 436 with a minimum of wear.

The slide plates 440 are suitably anchored rigidly to the base 85 of the apparatus and extend through the optical reader.

Importantly, the device-receiving upper plate 431 contains a row of vertically-disposed apertures 442 which are aligned horizontally with the blind recesses 33 of the device 31 when inserted into the stepped opening 42. The number of holes 442 correspond to the number of rows of blind resesses 33 and serve in conjunction with the hereinafter described optical reader to issue "permit-to-read" signals used to perform certain electrical tests among which is one designed to advise the operator that a certain error has occurred.

Figures 3, 4, 5, 6:
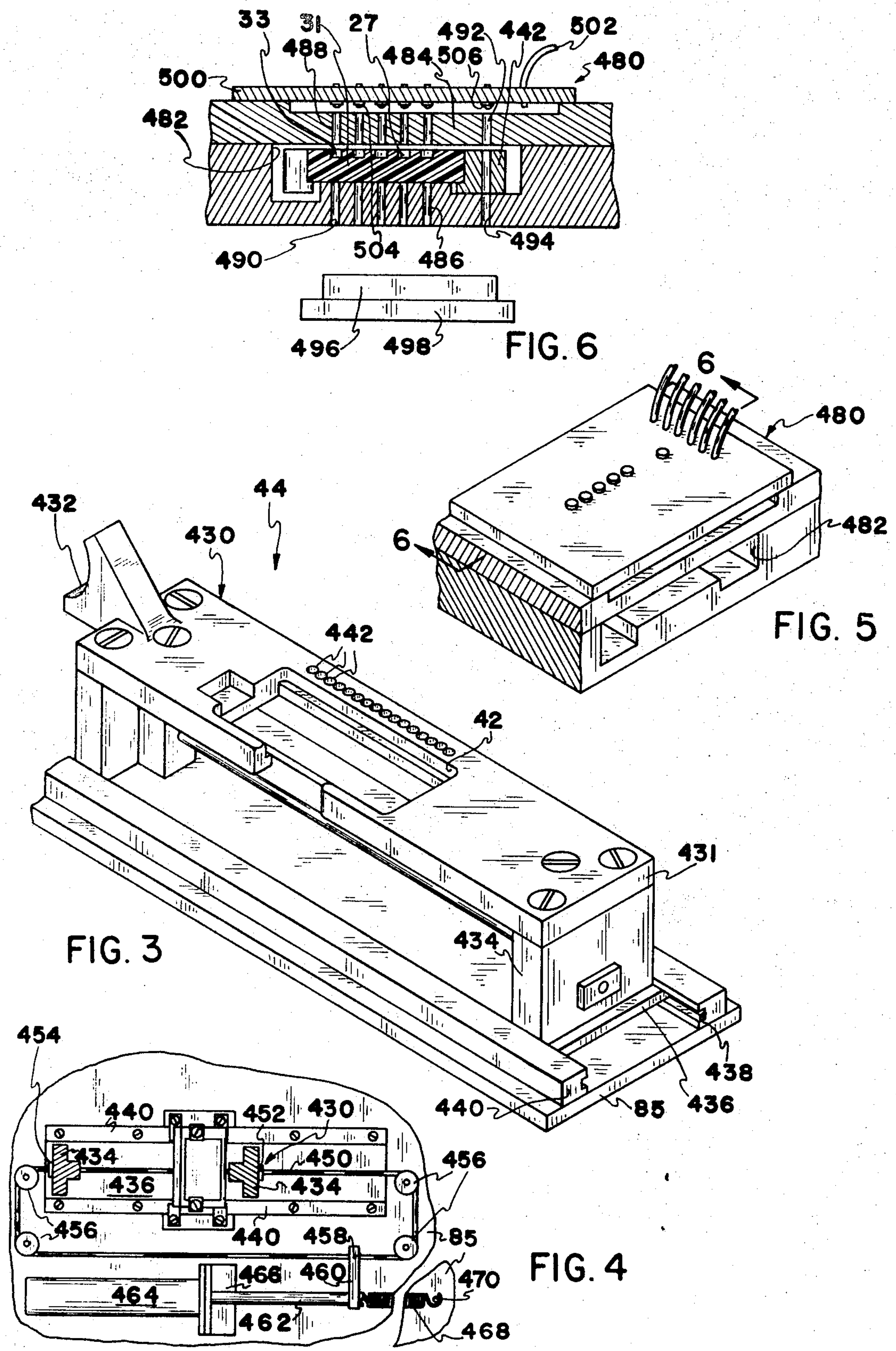
FIG. 3 is a perspective representation of the reader carrier.
FIG. 4 is a plan view of the return mechanism for the reader carrier.
FIG. 5 is a perspective representation of the optical reader.
FIG. 6 is a cross section taken along line 6—6 of FIG. 5.

As is evident by reference to FIG. 4, after the reader carriage 430 has been rectilinearly displaced into the housing of the apparatus to its initial reading position, release by the operator causes the carriage 430 to immediate return to its original at-rest position without further operator action. This is due to the fact that the carriage 430 is attached to a closed loop cable 450 anchored at 452 and 454 to the spacers 434 and passing around four pulleys 456 as illustrated to an attachment site 458 to a cable attachment bar 460 eccentrically, non-rotatably anchored near the leading end of a piston rod 462. The closed loop cable assists in reducing or eliminating chatter. The piston rod extends from a dashpot cylinder 464 which is anchored rigidly to the base of the apparatus 85 by use of a bracket 466. The eccentric cable attachment bar 460 is also secured to one end of an extension spring 468. The other end of the spring 468 is anchored to the base 85 at pin 470. Consequently, when the carriage 430, in its initial reading position, is released by the operator, the spring 468 is substantially extended exerting tension upon the piston rod 462 and urging the closed loop cable 450 in a counterclockwise direction as viewed in FIG. 4. The force of the spring 468 returns the carrier 430 to its initial at-rest position external of the housing of the apparatus at a substantially uniform rate controlled by the rate of venting of the dashpot cylinder 464.

THE OPTICAL READER

When the identification device 31 is correctly positioned for initial reading, it is located within the optical transducer reader 480 (see FIGS. 5 and 6). The reader 480 comprises an inverted U-shaped opening 482 into which the tracks 440 are disposed and through which the carrier 430 reciprocates. The reciprocation of the carrier 430 will correctly interpose the identification device 31 between upper and lower masks 484 and 486. The masks 484 and 486 have five vertical bores 488 and 490 respectively, each bore 488 being in alignment with one bore 490 and with one blind recess 33 in the deivce 31. An additional vertical bore 492 in the upper mask is aligned with a similar bore 494 in the lower mask, and together are successively aligned with each "permit-to-read" bores 442 in the top plate 431 of the carriage 430. A ligth source 496 and a reflector 498 are suitably disposed below the bores 490 and 494 causing light to travel through the last-mentioned bores when the lamp 496 is illuminated. If no ball is present in the device 31 between aligned top and bottom bores, the associated photo transistor disposed immediately above the top bore and carried by the board 500 will turn on and provide an increased voltage level to its output lead 502. When no light is received due to the presence of an opaque ball 27 in the aligned blind recess 33, a relatively low voltage level is maintained by the associated photo transistor 504.

Thus, in the described manner, as the identification device 31 is displaced from its initial reading position to its at-rest position, the photo transistors scan row-by-row and input voltage levels within the photo transducer block, either high or low. The circuit logic converts the outputs of the photo transducer block into a human readable output at the display panel 52 (FIG. 1). Timing signals are similarly generated by the photo transistor 506 as light passes through the bores 494 and 492 each time a "permit-to-read" hole 442 is in alignment with the last-mentioned bores.

ENCODER CIRCUIT LOGIC

Figure 7:
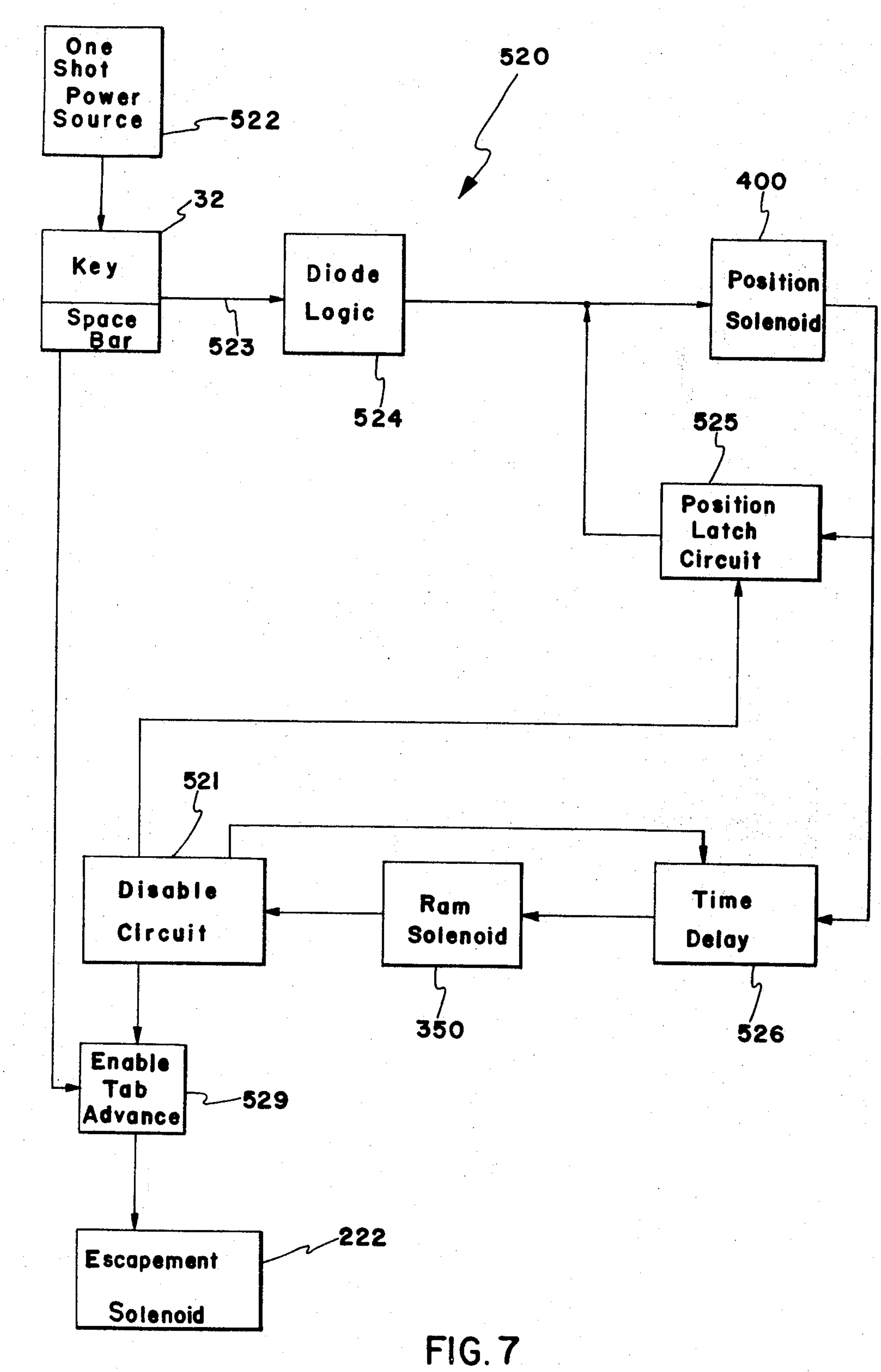
FIG. 7 is a block diagram of the encoder circuit logic.
Figure 7A:
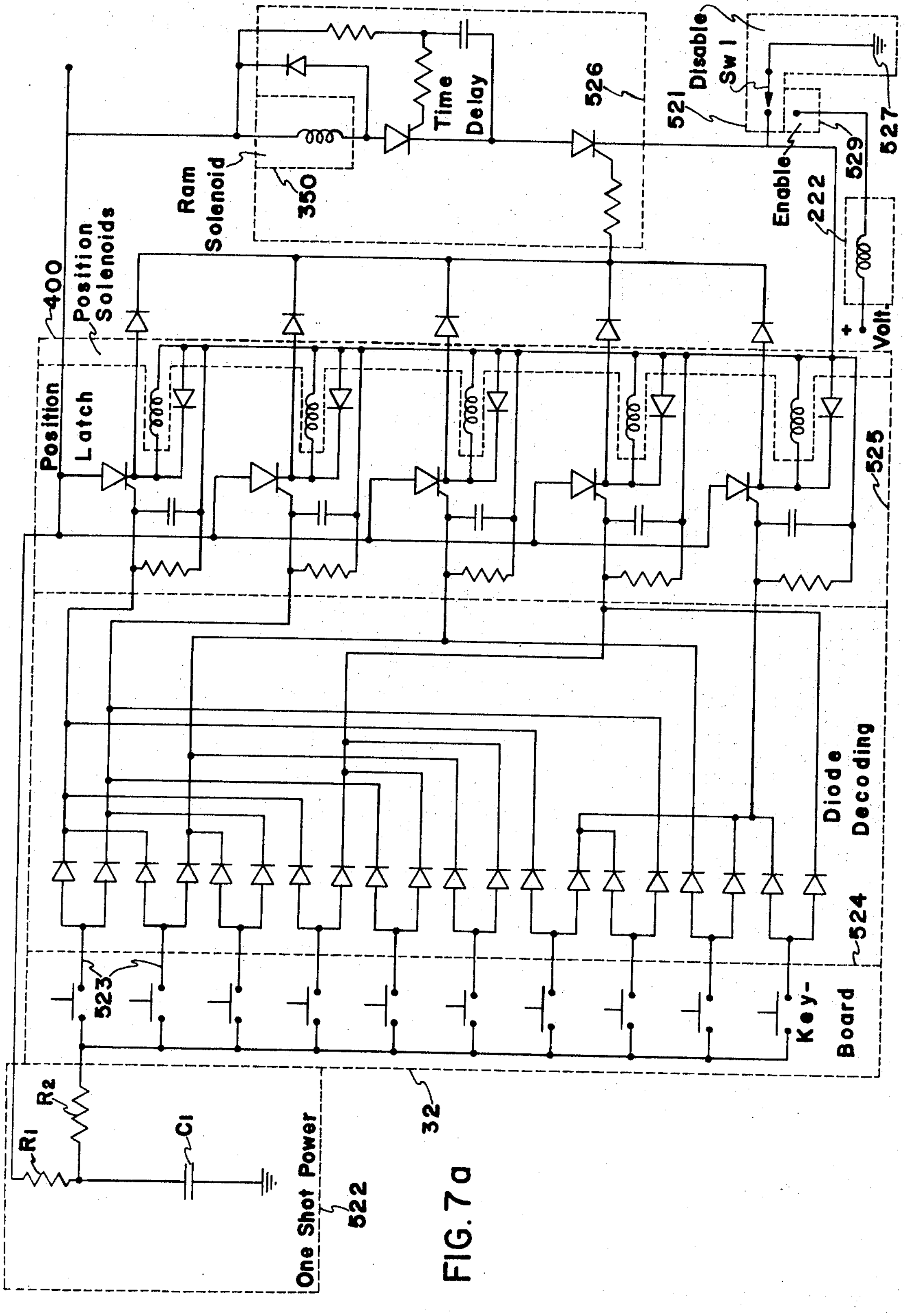
FIG. 7a illustrates circuit diagrams of the blocks of FIG. 7.

Specific reference is now made to FIGS. 7 and 7*a* which illustrate the encoder circuit logic 520. When supply power is initially activated the position solenoid, time delay and ram solenoid are all turned off. The switch SW 1 of the disable circuit 521 is in a position such that the entire circuit is grounded. Capacitor $C_1$ of the one shot power source 522 has charged to a positive voltage through resistor $R_1$ with a short time constant.

The operator then depresses a key, 0 through 9, of the keyboard which may be Model SB-033, manufactured by ALCO Electronic Products, Inc., of Laurence, Massachusetts. With this, a single positive going pulse is applied through one line 523 to the diode circuit 524 which turns on the appropriate two of the five SCR's 1 – 5 of the position latch circuit 525 which energize and latch the coils of the two associated position solenoids 400 which represent the number of the depressed key in two out of five code. The R–C circuits on the gates of the SCR 1 – 5 prevent "turn-on" due to stray electrical noise.

When the two position SCR's are actuated, a positive-going voltage is deployed through the decoupling diode group, D26–30, and through the current limiting resistor $R_5$, into the gate of SCR 7. This turns on SCR 7 which then turns on the time delay circuit 526.

The time constant of the circuit is controlled by resistor $R_3$ and capacitor $C_2$. When capacitor $C_2$ has charged sufficiently, it turns on SCR 6 through resistor $R_4$. SCR 6 then supplies voltage to energize the ram solenoid 350.

The solenoid operates the described mechanical devices which, together with the position solenoid, encodes the identification device with the appropriate code. When the ram solenoid or solenoids 350 have pressed the balls 27 into the blind recesses 33, it mechanically switches switch SW 1 to momentarily disconnect the common ground 527 from the circuit. This causes all SCR's to turn off and thereby causes all solenoids to return to their relaxed positions.

It is important to note that the cycle will not repeat itself until the initiating key is released and the capacitor $C_1$ can become recharged.

Finally, when switch SW 1 de-activates the circuit, it also provides a pulse which causes the encode-carrier to advance into position for the next operation by grounding one end of the coil of the escapement solenoid 222.

Depression of the space bar provides a signal through line 530 also causing the encoder carrier and identification device to advance one position.

READER CIRCUIT LOGIC

Figure 8:
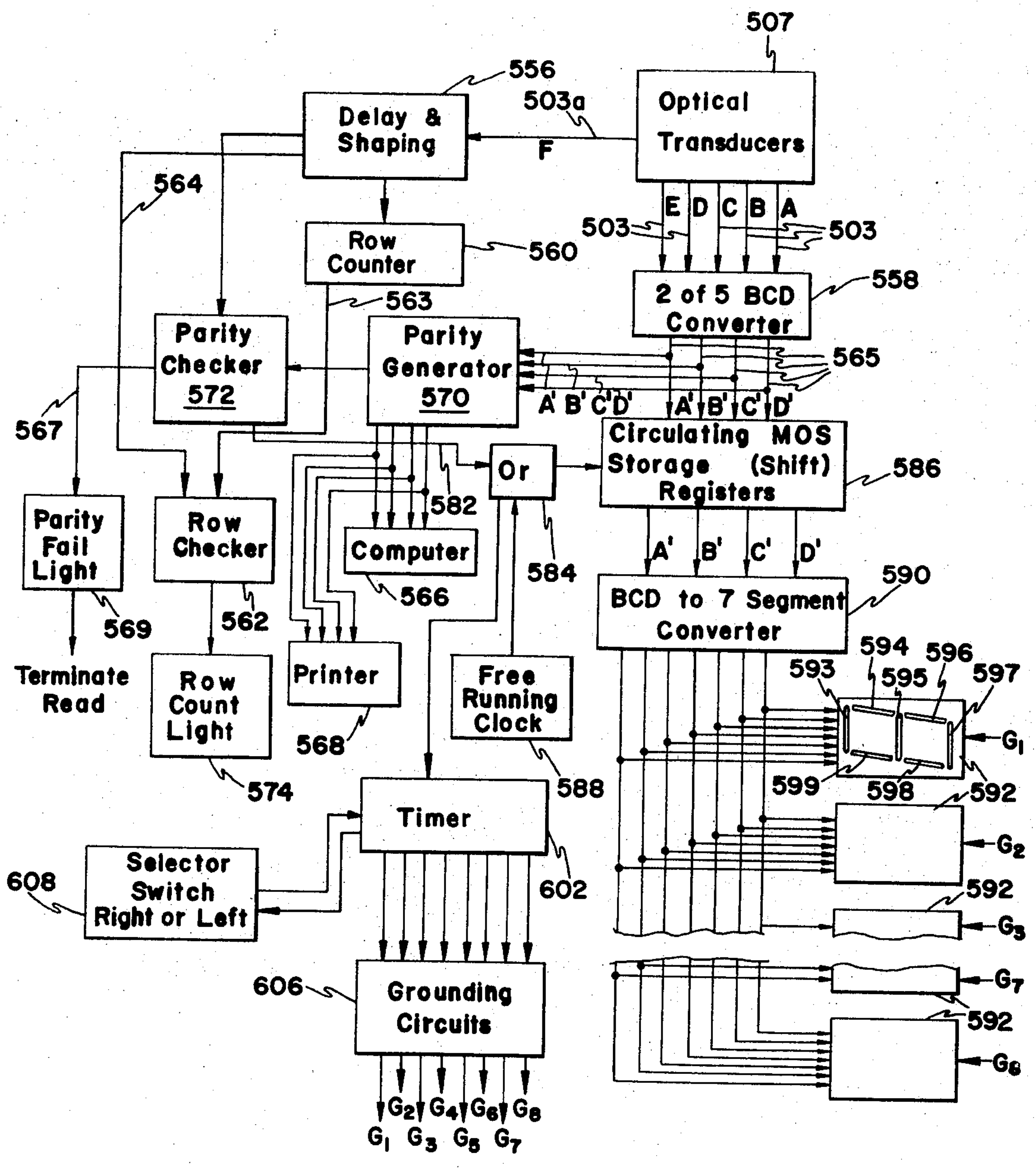
FIG. 8 is a block diagram of the reader circuit logic.

The output of the transisters 504 and 506 in the optical transducer 507 consists of five information lines 503 bearing the two of five code signals A through E and one timing line 503a bearing the so-called permit-to-read signal F. See FIG. 8. The "permit-to-read" signal is conditioned by the delay and shaping circuit 556 to provide a short window pulse. The window pulse is used as a timing signal and will be further explained hereinafter.

The five lines 503 from the transducer 507 are input to a two of five BCD Converter 558.

A row counter 560 counts the number of rows of encoded or information sites which have been read by the optical reader at any given point in time. The row counter 560 outputs a signal to the row checker 562 through the line 563 when its count is the same as the number of rows to be counted.

The converted output information from the BCD converter 558 consists of four signals communicated through lines 565, the four signals bearing the same numeric information as the two of five signals but in BCD (Binary Coded Decimal) format. BCD is useful since most printers, computer terminals, etc., use the BCD format. Therefore, the BCD output can be channelled to a computer 566 and/or a printer 568. The BCD conversion is also useful in determining correct parity of the numeric information. Parity is defined to exist when the two of five code is converted into an acceptable BCD number. The check to determine whether parity exists is made using in the parity generator 570 and the parity checker 572.

The output of the parity generator is significant only at one instant of time for each row of the encoded plate. This time is determined by the window pulse emanating from the delay and shaping circuit 556 and reaching the parity checker 562 through line 564. The parity checker 572 waits until the window pulse occurs and then outputs a signal which depends on the existence of parity in the parity generator 570 at the time the window pulse occurs. Valid parity is indicated by a low voltage output from the generator 570. A high output from the generator 570 indicates that at the indicated instant in time no acceptable parity condition was detected.

If no parity exists at the instant in time when the window pulse occurs, a signal will be sent from the parity checker 572 through the line 567 to the parity fail light 569 providing a visual warning to the operator at window 48. Also, the parity checker disables further output through line 582 to the Or circuit 584 thereby terminating the read cycle.

In the event that the row checker 562 receives a signal from the delay and shaping circuit 556 after having received a signal from the row counter, during the same cycle, the row count light 574 is illuminated, indicating to the operator at window 50 that an error has been made.

Also, when parity exists at the time the window pulse is received, the parity checker 572 outputs a signal to the Or circuit 584 through line 582. The Or circuit transmits the signal to the shift input of the circulating MOS storage shift registers 586. The registers 586 also receive the four BCD signals A′ – D′.

When the shift pulse occurs in the registers 586 the BCD information derived from the two of five BCD converter is shifted into storage. After the cumulative number of shift pulses received equals the number of rows to be read on the plate, the storage registers in 586 are fully loaded. At this time, the free-running clock 588 transmits clock pulses through the Or circuit 584 to shift the input of the storage registers 586 causing the information in the registers to serially circulate continuously.

At the time of each circulation, the recirculating output from the last storage stage is also inserted into the BCD to seven-segment converter 590. Thus, the stored rows of information are recirculated as they are output from the registers 586 to the converter 590.

The seven-segment conversion is necessary in order to drive the seven-segment display lights 592, eight of which are presently preferred. However, if more than eight rows of sites on the identification device 31 are used, an equal number of lights 592 could be used. Each display light may comprise a Mosaic Indicator Model MS — 6A manufactured by ALCO Electronic Products, Inc., of Laurence, Massachusetts.

The seven outputs of the converter 590 are individually connected in parallel to the corresponding lamp segment, of which there are seven identified by the numerals 593 – 599, in each of the eight seven segment display lights 592.

In order to avoid simultaneous display on each light of each numeral represented by the seven-segment data, only one light 592 is grounded at any one point in time. The grounding of the lights 592 is controlled through the grounding circuits 606. The grounding of the lights 592 occurs in sequence corresponding to the sequence of the output of rows of seven-segment converted data issuing from the converter 590.

More specifically the timer 602, which is clocked by the Or circuit 584, governs the sequential grounding of the lights 592.

The timer 602 generates signals selectively to ground only one light at a time in order, synchronous with the shifting of the storage registers and the output of information from registers 586 to converter 590. If fewer lights 592 are used than the number of encoded two of five information rows, a signal from a selector switch 608 to the timer 602 can be used to sequentially display numerals corresponding to the data in sets.

OPTICAL TRANSDUCER

The sensing mechanism which responds to the presence or absence of a ball in alignment with the bores or optical windows 488, 490, 492 and 494 of the optical reader 480 is the optical transducer 507. The optical transducer 507 consists of six photo-sensitive transistors 504 and 506, which may be Model LS600 manufactured by Texas Instruments, Inc. In each case, with specific reference to FIG. 9, if a ball is not present to impede the transmission of light, the corresponding photo-sensitive transistor becomes saturated allowing the supply voltage to appear to its emitter output. If a ball is present, the light path is interrupted, causing the corresponding photo-sensitive transistor to assume the off state, in which its emitter output is close to zero volts.

Each emitter output is connected to the input of an integrated inverter 712–717. These inverters output five numerical bearing signals A - E corresponding in voltage to the presence or absence of a hole in the five positions of a row of the identification device 31 being read. These information signals are coded into two of five code, in which the numerals from zero to nine can be represented by two and only two balls per row or two and only two high voltage level outptus by the inverters 712 – 716. The output of the inverter 717 corresponds to holes 442 in the top plate 431 of the reader carrier 430, as previously mentioned. The output of the inverter 717 is, therefore, a "permit-to-read" signal, notifying the remainder of the electronics each time a new row of information becomes aligned with the optical windows in the optical reader 480.

THE BCD CONVERTER

The two of five code signals from the optical transducer 507 are input to the coding gates in the two of five BCD converter 558. See FIG. 10. The two of five code is decoded into the numbers 0 through 9. For example, the numeral one is represented by signals A and B from inverters 512 and 513 being at the high voltage level, such as five volts, and the signals C, D, and E from the inverters 714 – 716 being at the low voltage level, such as approximately zero volts. The Nor gate 724 responds to the condition of signals C, D, and E simultaneously by switching its output to the high level. This high level is one of the inputs to the Nand gate 726.

In this example, signals A and B, also inputs to NAND gate 726 are also high. Since all inputs to the NAND gate 726 are high simulatenously, its output is low. A low level at the output of the Nand gate 726 indicates that the number encoded in the row in question of the identification device 31 was one. The output of each of the other Nand gates representing numbers 2 through 9 in this particular example will all be high. Thus, the one correct number has been uniquely decoded.

By observation, it should be noted that the sets of Nor and Nand gates represent the various possible combinations of high and low outputs comprising the signals A – E.

The next step in the BCD conversion is to generate BCD signals from the encoded numbers.

The output of the several Nand gates 728 – 731 form the BCD representation of the decoded number. The output of the Nand gate 728 is considered to represent the numeral 1 when high. A high output from the gates 729 – 731 represent the numerals 2, 4 and 8, respectively. The weighted outputs of these four gates must be summed to determine the decimal number which they represent. Thus, to form the BCD representation of the number, the output of gate 726 is an input to the gate 728, since they both represent the number 1. The output of the gate 742 is input to the gate 729, since both represent the number 2. The output from the gate 744 representing the number 3 must be input to both gates 728 and 729, since three must be represented in the BCD by the sum of the numerals 2 and 1. The remaining numbers are similarly converted whereby the signals A′ – D′ are obtained.

PARITY GENERATOR

Figure 10:
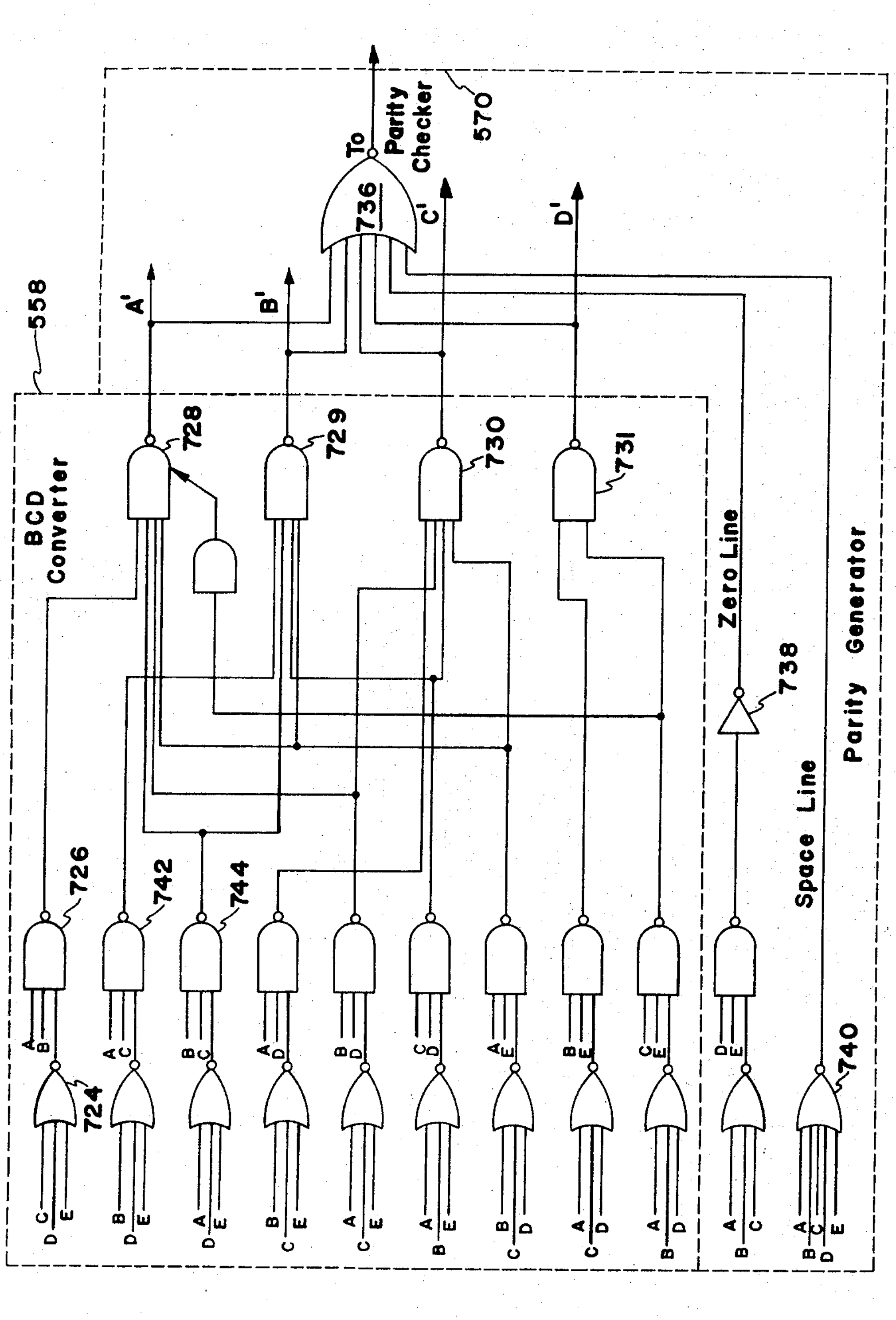
FIG. 10 illustrates the circuit diagram for the BCD converter and the parity generator.

With continued reference to FIG. 10, it should be noted that parity is said to exist when a number on the identification device 31 is converted to a recognizable BCD number by the BCD converter, or when an uncoded row (one without balls) is detected. The gate 736 has as inputs the outputs of the BCD gates 728 – 731, i.e., signals A′ to D′, or a positive indication of zero from the gate 738 or a signal that a space was decoded from the gate 740.

If any valid condition is detected by the gate 736, its output is low. Otherwise, its output is high, indicating that at the instant in time in question (no acceptable condition is being detected by the parity generator 570. The output of the gate 736 passes to the parity checker 572.

THE DELAY AND SHAPING CIRCUIT

Figure 11:
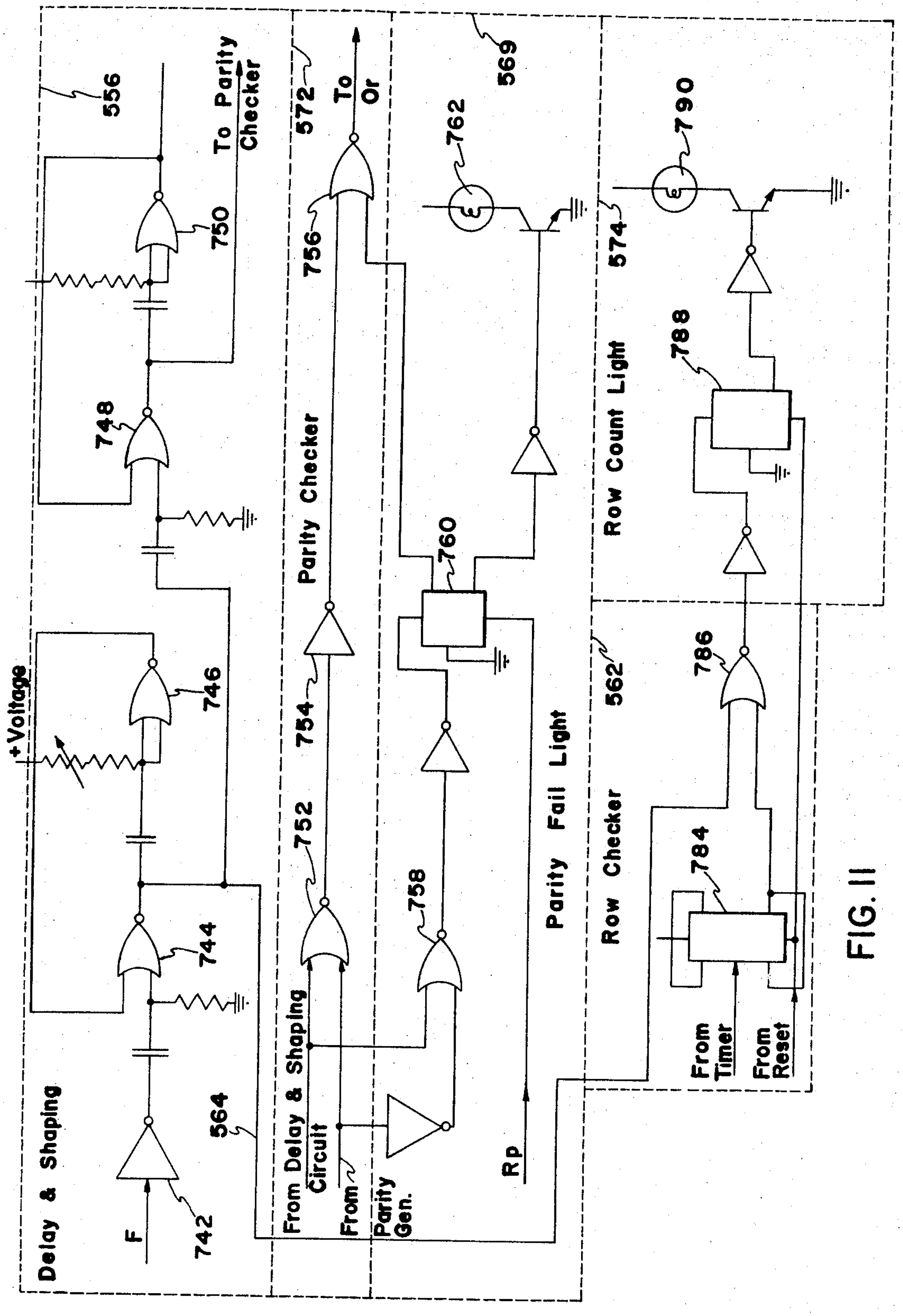
FIG. 11 illustrates circuit diagrams for the delay and shaping circuit, the parity checker, the parity fail light and terminate read circuit, the row checker, and the circuit to turn on the row count light.

With reference to FIG. 11, the delay and shaping circuit 556 shapes the "permit-to-read" pulse output F from the gate 717 of the optical transducer 507. In so doing, a window pulse is generated which is used for timing in the parity checker 572. The output F from the gate 717 is inverted by gate 742, and input to the monostable circuit represented by gates 744 and 746. The monostable circuit responds only to the leading, or positive-going edge of the pulse from the gate 742. The duration of the pulse from the gate 744 is preferably set to sixteen milliseconds, approximately one-half the duration of a row-read operation. The monostable circuit formed by the gate 748 and 750 preferably generates a five microsecond pulse, positioned in time by the leading edge of the pulse from the gate 744. This short pulse is a window pulse for use in a parity checker circuit 572.

PARITY CHECKER

With continued reference to FIG. 11, the purpose of the parity checker 572 is to determine if correct parity exists at the same time that the window pulse from the delay and shaping circuit 556 occurs.

The window pulse from the gate 748 is input to the gate 752 along with the parity signal output from the gate 736 of the parity generator 570. When the window pulse goes low for its short duration, the output of the gate 752 will go high if parity is then correct. This is the normal in expected occurrence. This pulse is inverted by gate 754 and input to gate 756, which merely inverts the pulse again unless the gate is disabled by a previous parity failure.

PARITY FIALURE AND TERMINATE READ

With continued reference to FIG. 11, the circuitry for turning on the parity fail light and for terminating the read cycle will now be described. This circuitry receives the inverted parity signal from the parity generator 570 and outputs a pulse from gate 758. This pulse and the pulse output of a gate 752 are normally mutually exclusive. The inverted output of the gate 758 is used to set flip-flop 760, which disables gate 756 and turns on the parity fail light 762. In this fashion, the operator is warned of the failure and the pulses from the gate 756, which load the registers 586, are disabled terminating the read cycle as far as electronics are concerned.

THE OR CIRCUIT

Figure 12:
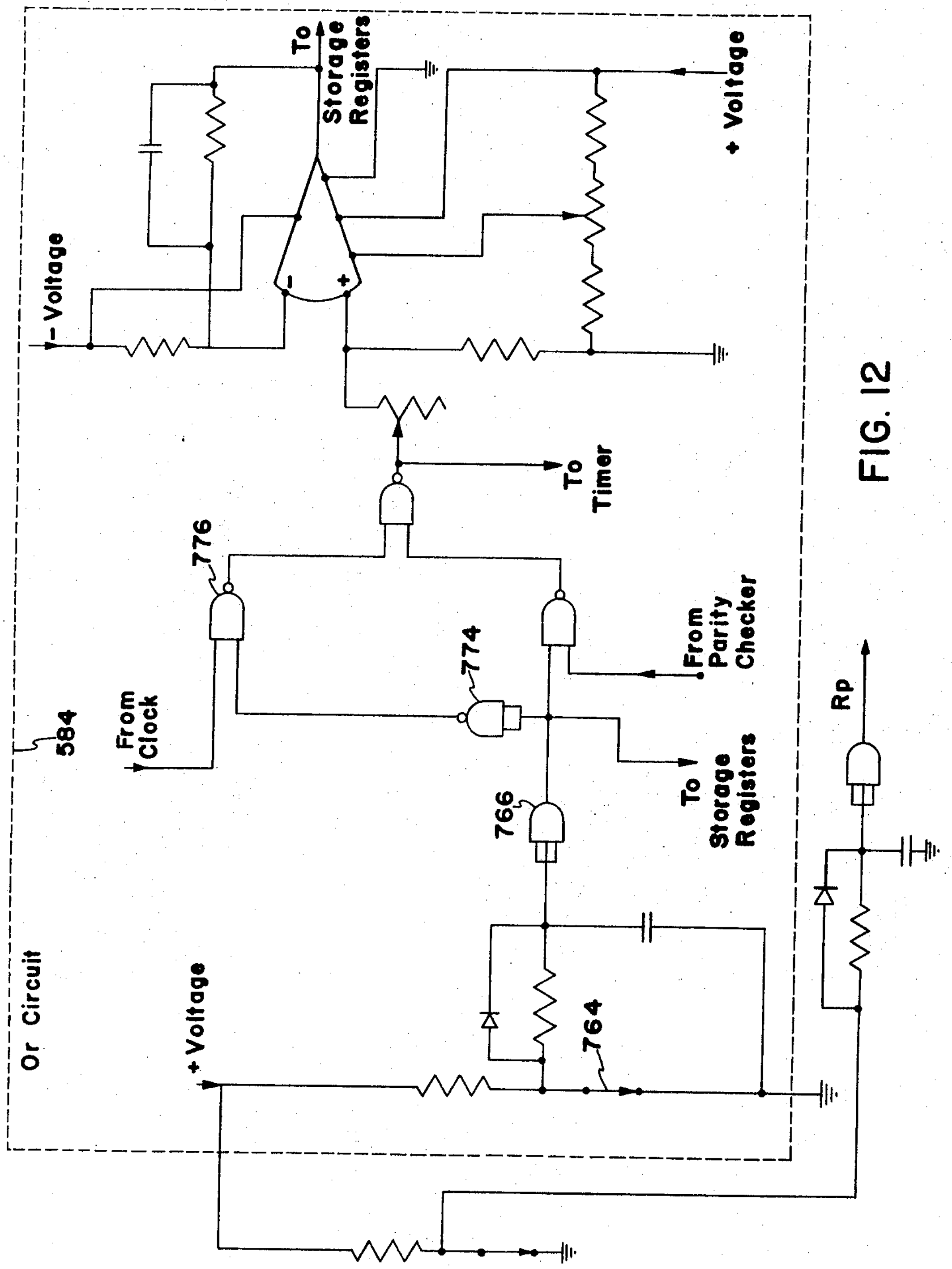
FIG. 12 illustrates a circuit diagram for the Or circuit and for an associated reset circuit.

The Or circuit 584 illustrated in detail in FIG. 12 formulates the shift pulse for the circulation storage registers 586. The Or circuit 584 operates in two modes. During mode 1, the reader carrier holding the identification device 31 is inserted into its initial reading position in the mechanism causing the switch 764 to be open. When this switch is open, a high level is introduced to gate 766 through a delay circuit.

Since gate 766 is non-inverting, a high level is input to gate 768, enabling the passage through the gate of the shift pulse from the gate 756 of the parity checker 572. Gate 770 also passes the pulse which is input to a level-shifting circuit 772. The level shift is necessary since in the mentioned example the integrated circuit gates output voltage levels of five and zero volts, while the shift pulse used by the circulating storage registers 586 must have ten volt and negative six volt levels.

During mode 2, when the read operation is completed, the reader carrier with the identification device is fully extended and the switch 764 closes. The switch 764, therefore, grounds the input to gate 766 and disables gate 768. However, because of inverter 774, gate 776 becomes enabled allowing the pulses from the free-running clock 588 to propagate into the level shifter 772.

Thus, the Or circuit 584 transmits either the pulse generated by the parity and the "permit-to-read" signals (when in the read mode) or the free-running clock pulse (when in the second mode). In both modes, the end result is the generation by level shifter 772 of a signal capable of causing the circulation storage registers 586 to shift.

CIRCULATION STORAGE REGISTERS

Figure 13:
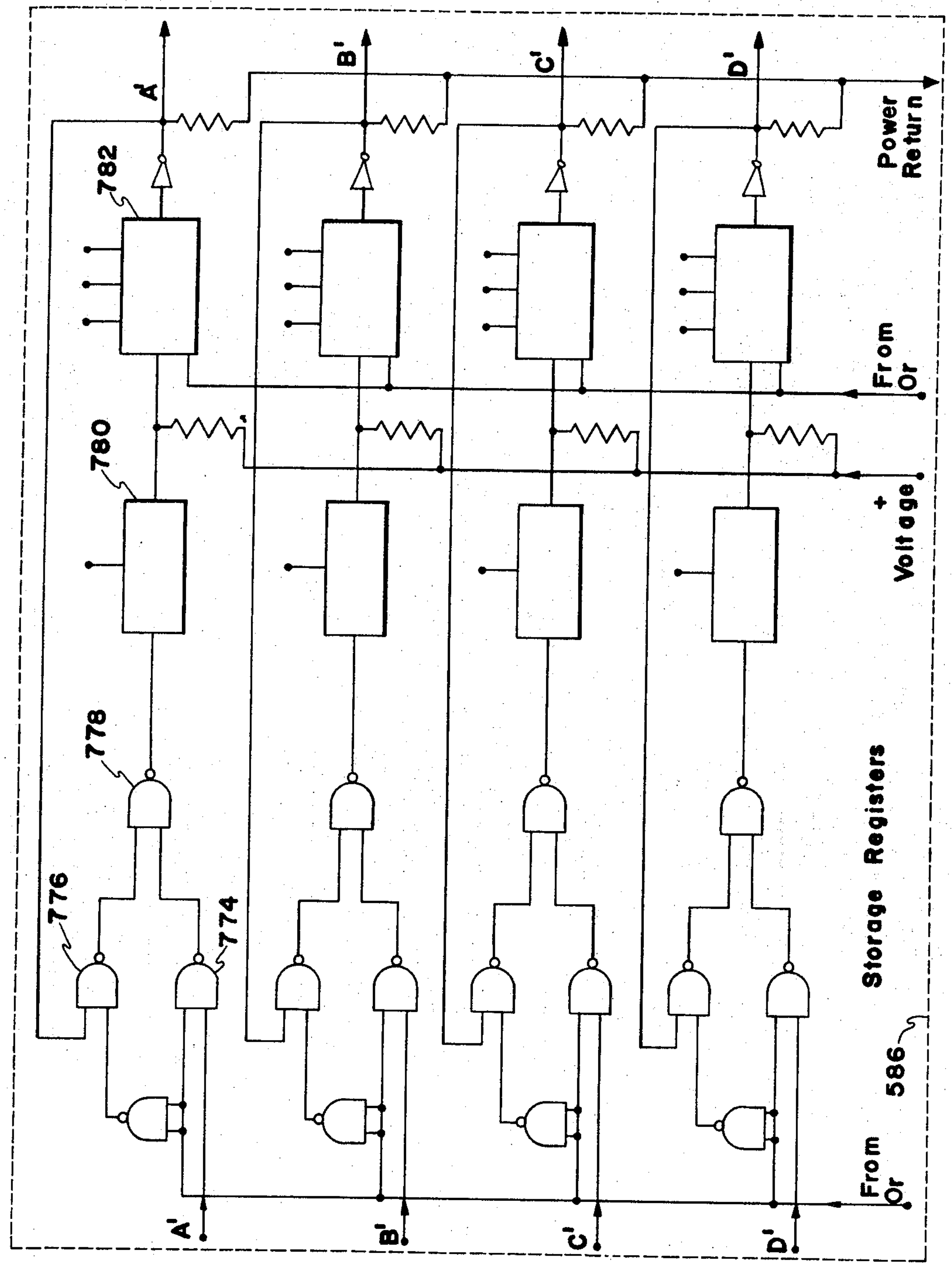
FIG. 13 illustrates a circuit for the circulating MOS storage shift registers.

With reference to FIGS. 13, the storage registers 586 operate in the same two modes as does the described Or circuit 584. The switch generated output of gate 766 is used to control whether new BCD numbers are allowed to enter the storage register 586 or whether the number just output from the registers is fed back around and reinserted into the registers. Since the function of the circuit is identical for each of the four BCD values, only the eight weighted path is described. The eight-weighted value from gate 731 (signal D') is input directly to gate 774. If switch 764 of the Or circuit is open as in mode 1, gate 774 is enabled, passing the eight-weighted signal through gates 778 and 780, the latter being required as an interface element. The eight-weighted signal is then presented to the input of the MOS device 782. Then, at the next shift pulse from the level shifter 772 to the MOS device 782, the eight-weighted weighted value is shifted to the next register.

During mode 2, gate 774 becomes disabled. The input signal to the MOS device 782 is then derived by the feedback path from the last stage of the MOS device 782 back into the first state of 782 through gates 776, 778 and 780. In mode 2, the data in the MOS devices circulate at a rate determined by the free-running clock.

ROW CHECKER

With reference to FIG. 11, in mode 1 only the number of rows of blind recesses in the identification device 31 should be read. However, due to electronic malfunctioning and other causes, more than the maximum number of "permit-to-read" pulses from gate 744 may be detected by the row checker 562.

After the maximum number of rows have been detected, the flip-flop 784 sets, enabling gate 786. Then, if another pulse from gate 744 is detected, gate 786 goes high. This signal is input to the row count light circuitry to turn on the light.

ROW COUNT LIGHT

The row count light circuit shown in FIG. 11, receives row count error signals from the gate 786 and sets flip-flop 788. The buffered flip-flop output turns on transistor 790, causing the row count lamp to be illuminated.

BCD TO SEVEN-SEGMENT GENERATOR

Figure 14:
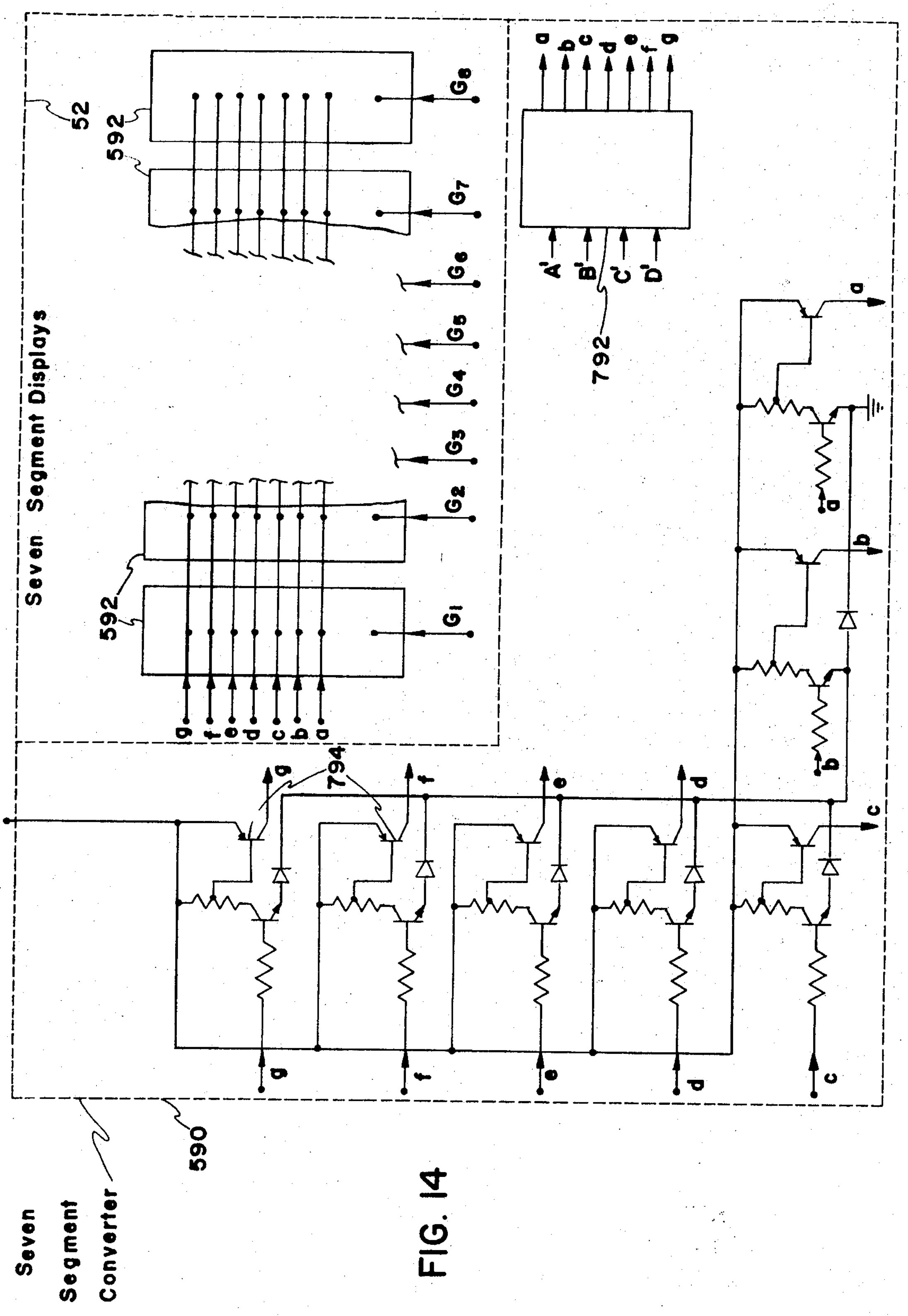
FIG. 14 illustrates circuits for the BCD to seven-segment converter and for the seven-segment displays.

With reference to FIG. 14, when mode 2 commences, the BCD numbers which exit the circulation storage registers 586 only to be reinserted are also input to a commercial integrated circuit device 92. For example, device 792 may be Model 930759 BCD to Seven-Segment integrated circuit, manufactured by Fairchild. This device generates the required levels to turn "on" the light segments of the seven-segment displays 592. These signals are amplified to a higher voltage, e.g., 20 volts, which is accomplished by pairs of transistor 794.

SEVEN-SEGMENT DISPLAYS

With continued reference to FIG. 14, the displays 592 are indicator lamps which contain seven lights which can be turned on individually. Any of the decimal digits can be approximated by lighting combinations of the seven-segment lamps. The output of the amplifying transistors 794 are connected to all of the corresponding segments of all eight seven-segment displays 592. The segment lamps will turn on, however, only when the ground circuit for the particular indicator housing the segment lamps is activated. The effect is to present the number in the last stage of the circulating storage registers 586 to all of the eight displays, but only to ground a particular display on which the number is to be illuminated.

The shift pulse and the grounding circuits are controlled synchronously by the free-running clock 588. When the next shift pulse occurs, the next number in the registers 586 is presented to the BCD to seven-segment converter 590 and from there to all of the eight displays simultaneously, but only the next indicator is grounded, displaying the number. The numbers, therefore, cycle at the clock rate and the lights are turned on in succession by the same clock. The cycle rate is high, for example, two hundred complete cycles per second. Thus, the lamps do not appear to flicker. This technique is a significant cost reduction factor, since only one BCD to Seven-Segment Converter 590 is required, instead of eight.

THE FREE-RUNNING CLOCK

Figures 9, 15:
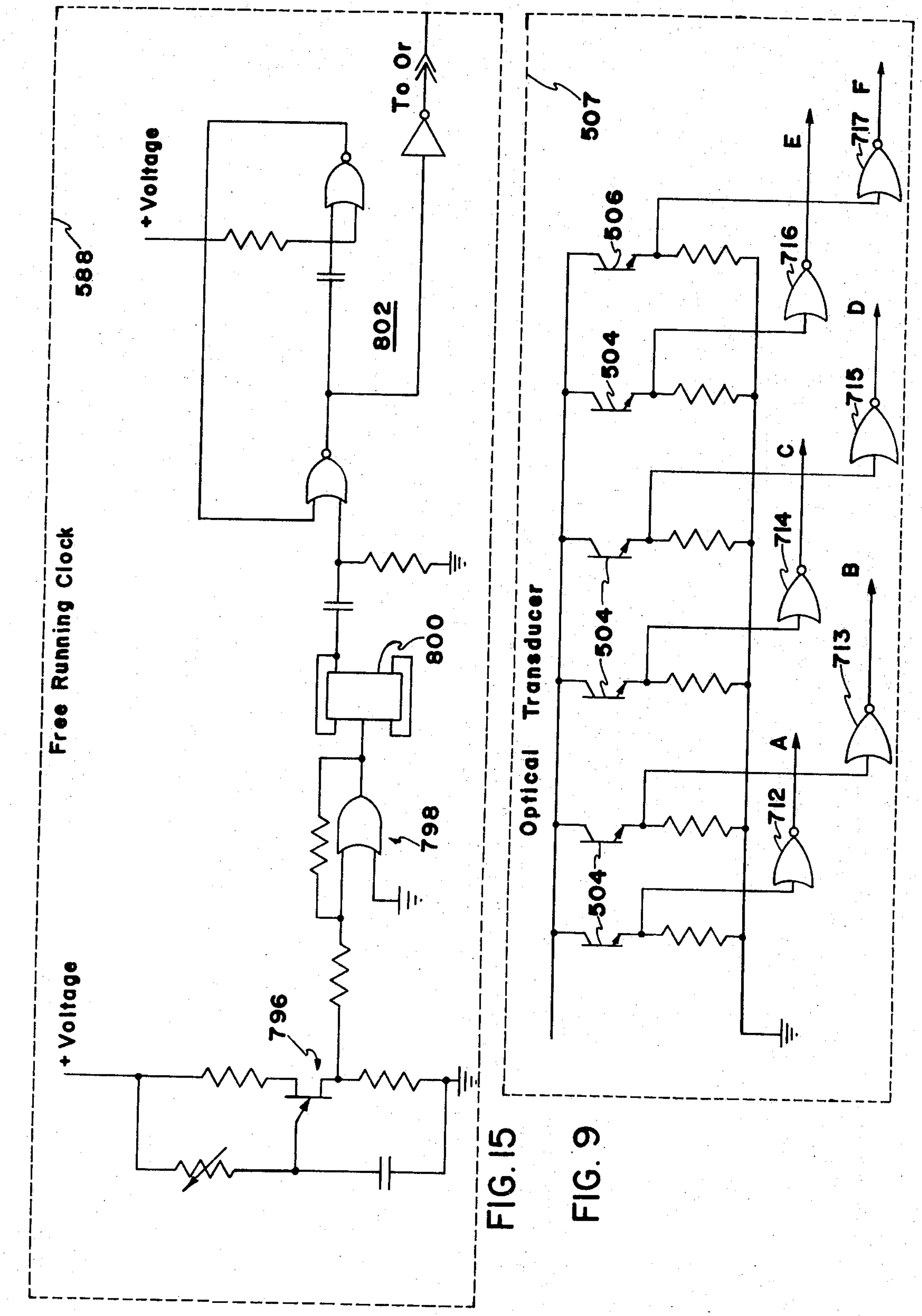
FIG. 9 is a circuit diagram of the optical transducer.
FIG. 15 illustrates a circuit of the free-running clock.

With reference to FIG. 15, the free-running clock 588 consists of a standard unijunction oscillator circuit 796 followed by a Schmitt trigger 798 to help improve the pulse shape. Preferably, the pulses occur approximately six thousand, four hundred times per second. The flip-flop 800 divides the rate in half, outputting a sample wave at 3.2 KHz. The squarewave is input to the monostable circuit 802 which outputs a train of five microsecond pulses at the rate of 3.2 KHz.

THE TIMER

The timer 602 is driven by the clock 588 through the Or circuit 584 and it generates the sequential signals to ground the seven-segment display indicators 592. Its input is the output of the OR circuit 584 issuing from gate 770 prior to the level of shifting. The pulse drives three toggle flip-flops 804 (FIG. 16) which operate as a counter. The eight possible states are decoded by the gates 806 and input through gates 808 to the transistors 810 which actually ground the indicator lamps 592. The timer 602 causes the transistors 810 to saturate in succession at the clock rate.

THE SELECTOR SWITCH

Figure 16:
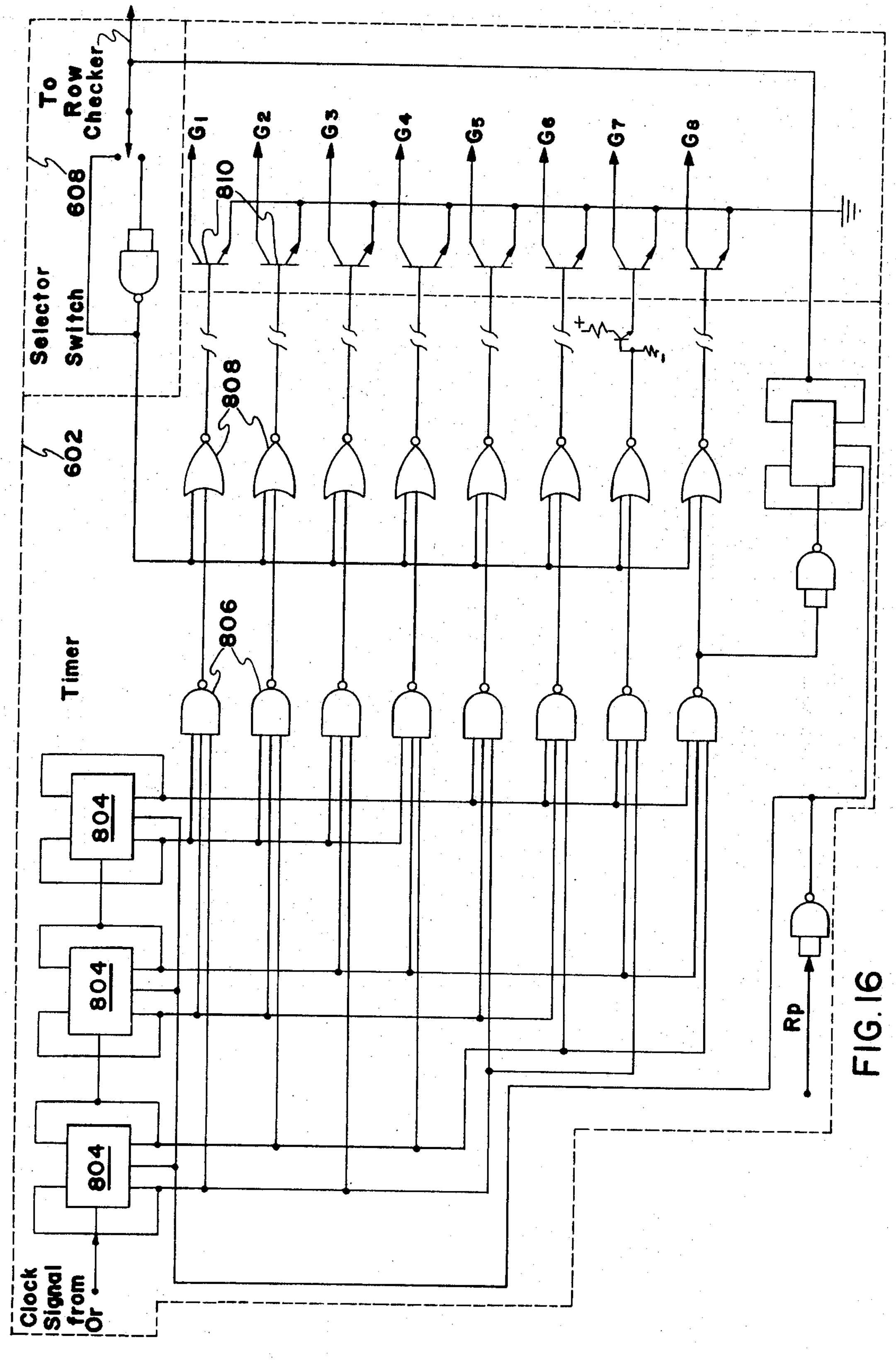
FIG. 16 is a circuit for the timer, for the select switch and for the grounding circuits.

The selector switch 608, illustrated in FIG. 16, is an operator-accessible switch to select the particular numbers to be displayed at the display panel 52. Since only eight indicators are available and more numbers may be stored in the circulation registers 586, the operator must chose to display either the first set or the second set of numbers. This is accomplished by the selector switch 608, which enables the gates driving transistors 810 only for the appropriate set of numbers.

THE GROUNDING CIRCUITS

As indicated previously, the lamp grounding is accomplished simply by causing the transistors 810 to saturate in succession at the clock rate. In so doing, each transistor when saturated will provide a path to ground for the current in the lamp to which it is connected.

RESET

Since many timing functions within the electronics must operate in synchronism, a reset pulse $R_p$ is required. This pulse occurs when the reader carrier and the identification device are inserted fully into the reader thereby closing the switch SW 765 (FIG. 12). This reset input pulse resets flip-flop elements in the row checker, the row count light circuit, the parity fail light and the timer.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by the United States Letters Patent is:

1. Logic for transforming coded information sensed by a reader, comprising:

- means for generating signals representative of sensed code;
- means for converting the generated signals into a series of signals in binary data format;
- shifting storage means for serially outputting binary signals and circulating the binary signals within the shifting storage means in the order in which they are output;
- means for successively decoding the binary signals so that all the encoded signals are conducted, in the order in which they are circulated, to a plurality of display units;
- means for generating clocked grounding signals; and
- means for synchronizing the grounding and decoded signals so that a selected grounding signal and decoded signals arrive coincident in time at only one predetermined display unit.

2. Logic as defined in claim 1 wherein the decoding means comprises a binary converter for changing the binary signals to seven-segment output signals and wherein the display units comprise seven-segment readout units, each segment in a unit being electrically connected to a single output of the binary converter.

3. In a method of interpreting sets of code representations, comprising

- generating signals corresponding to the sets of code representations;
- serially placing the signals in storage;
- circulating the signals while in storage;
- serially issuing the signals to an output mechanism from storage;
- decoding the signals to obtain additional signals;
- communicating the additional signals to a plurality of display devices displaying human readable information; and
- developing timed grounding signals which successively complete a circuit to one said display device after another as said additional signals are consecutively communicated, whereby each display device displays readable information caused to be displayed by different additional signals.

* * * * *